United States Patent [19]

Sakagami et al.

[11] Patent Number: 5,466,755
[45] Date of Patent: Nov. 14, 1995

[54] OPTICAL FILTER

[75] Inventors: Teruo Sakagami; Takeo Ogihara, both of Iwaki; Yasufumi Fujii, Fukui; Hiroki Katono, Iwaki, all of Japan

[73] Assignee: Kureha, Kagaku Kogyo Kabushiki Kaisha, Tokyo, Japan

[21] Appl. No.: 208,890

[22] Filed: Mar. 14, 1994

Related U.S. Application Data

[63] Continuation-in-part of Ser. No. 106,976, Aug. 16, 1993, abandoned.

[30] Foreign Application Priority Data

Aug. 20, 1992 [JP] Japan ................................ 4-242585
Mar. 18, 1993 [JP] Japan ................................ 5-082527

[51] Int. Cl.⁶ .......................... C08F 2/44; C08K 5/098
[52] U.S. Cl. .................. 525/326.6; 359/885; 359/350; 524/398; 524/547; 524/781; 525/361; 525/364; 525/370; 525/371; 526/170; 526/172; 526/241; 526/277; 526/278
[58] Field of Search ..................... 524/398, 547, 524/781; 525/361, 364, 370, 371, 326.6; 526/170, 172, 241, 277, 278; 359/350, 885

[56] References Cited

U.S. PATENT DOCUMENTS

| | | | |
|---|---|---|---|
| 4,152,332 | 5/1979 | Bloom | 260/326.9 |
| 4,274,933 | 6/1981 | Kamada et al. | 524/547 X |
| 4,296,214 | 10/1981 | Kamada et al. | 524/398 |
| 5,024,923 | 6/1991 | Suzuki et al. | 430/372 |
| 5,191,029 | 3/1993 | DelDonno | 524/547 X |

FOREIGN PATENT DOCUMENTS

| | | |
|---|---|---|
| 0019097 | 11/1980 | European Pat. Off. . |
| 60-184542 | 9/1985 | Japan . |
| 61-20002 | 1/1986 | Japan . |
| 61-32003 | 2/1986 | Japan . |
| 61-134702 | 6/1986 | Japan . |
| 1201066 | 8/1970 | United Kingdom . |

OTHER PUBLICATIONS

Database WPI, Derwent Publications Ltd., London, GB AN 86–116734 & JP–A–61 057 674 (Fuji Photo Film KK) Mar. 24, 1986. Abstract.
Database WPI, Derwent Publications Ltd., London, GB; AN 93–240125 & JP–A–5 163 408 (Daicel Chem Ind Ltd) Jun. 29, 1993, Abstract.

*Primary Examiner*—Judy M. Reddick
*Attorney, Agent, or Firm*—Nixon & Vanderhye

[57] ABSTRACT

Disclosed herein is an optical filter comprising: a resin material obtained by copolymerizing a monomer represented by the following formula (I) and a monomer copolymerizable therewith; and a metallic compound mainly composed of a copper compound;

$$PO(OH)_n R_{3-n} \qquad (I)$$

wherein R represents

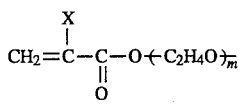

(wherein X represents a hydrogen atom or a methyl group, and m is an integer of 0 to 5), and n is 1 or 2.

5 Claims, 1 Drawing Sheet

OPTICAL FILTER

CROSS REFERENCE RELATED APPLICATION

This application is a continuation-in-part of U.S. patent application Ser. No. 08/106,976, filed on Aug. 16, 1993 and now abandoned.

BACKGROUND OF THE INVENTION

The present invention relates to an optical filter. More particularly, the present invention relates to an optical filter made of synthetic resins, which is capable of efficiently cutting-off light in the near infrared region and has light absorbing characteristics favorable for the adjustment of luminous efficiency.

Hitherto, the optical filters made of specific phosphate glass incorporated with copper ions have been used as photometric filters or luminous efficiency filters for cameras.

These optical filters made of glass, however, have involved many problems such as heavy weight, high susceptibility to devitrification with the passage of time due to high hygroscopicity, and difficulties in processing such as molding, cutting and polishing in the manufacture of the filters.

Optical filters made of synthetic resins have been proposed for solving the problem of "heavy weight".

U.S. Pat. No. 4,152,332 proposes an infrared absorber composed of a metal complex of a bis-[cis-1,2-bis-(alkyl, hydrogen, aryl or heterocyclic) ethylene-1,2-dithiolate].

JP-A-61-134702 proposes a near infrared absorbing filter having as its constitutional element an organic layer containing at least one of the compounds represented by the formula:

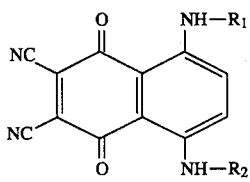

wherein $R_1$ is an aromatic group and $R_2$ is a hydrogen atom or an aromatic group.

JP-A-60-184542 proposes a methacrylic resin composition for infrared filters comprising 100 parts by weight of a methacrylic resin and 1.2 to 4.0 parts by weight of Solvent Green 28 which is an anthraquinone dye.

JP-A-61-32003 proposes an optical filter material containing at least one of the compounds represented by the following formula:

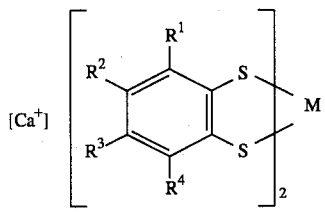

wherein M is Cu, Co, Ni, Pd or Pt; $Ca^+$ denotes a cation which neutralizes the complex; and $R^1$, $R^2$, $R^3$ and $R^4$ each represents a hydrogen atom, a halogen atom, an amino group, a cyano group, a hydroxyl group, or an alkyl group, an aryl group or a heterocyclic group in which a divalent coupling group may exist between the benzene ring to be bonded and such group, at least one of these groups may be an electron donative group, and these groups may be the same or different from each other.

JP-A-61-20002 proposes an optical filter material containing at least one of the organo-metallic compounds represented by the following formula:

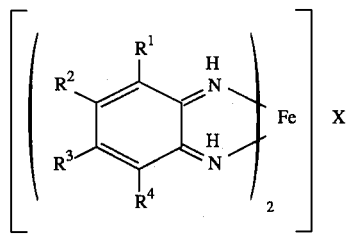

wherein $R^1$, $R^2$, $R^3$ and $R^4$ are each a hydrogen atom, a halogen atom, a cyano group, a hydroxyl group, or an alkyl group, an aryl group, a cycloalkyl group or a heterocyclic group in which a divalent coupling group may exist between the benzene ring to be bonded and such group, or $R^1$ and $R^2$, $R^2$ and $R^3$ or $R^3$ and $R^4$ designate the non-metallic atomic groups which are bonded to each other to form a 5- or 6-member ring, and the groups the $R^1$ to $R^4$ group may be the same or different from each other; and X denotes an anion which neutralizes the cation in the above formula.

Any of these filters, however, fails to satisfy all of the quality and performance requirements for an optical filter, such as high cut-off efficiency for light in the near infrared region, low hygroscopicity and good processability. Therefore, it is strongly required to provide an optical filter which is light in weight, low in hygroscopicity and good in processability.

As the result of the present inventors' extensive researches on the subject matter, it has been found that by molding a composition prepared by adding a metallic compound mainly composed of a copper compound to a resin material obtained by copolymerizing a specific monomer having a phosphorous group with another monomer copolymerizable therewith, the obtained optical filter made of synthetic resins is capable of efficiently cutting-off light in the near infrared region, low in hygroscopicity, proof against devitrification with the passage of time and light in weight, and is suited for use as a photometric filter or a luminous efficiency filter for cameras. The present invention has been attained on the basis of this finding.

SUMMARY OF THE INVENTION

The object of the present invention is to provide an optical filter made of a synthetic resin composition, which is capable of efficiently cutting-off light in the near infrared region, light in weight, low in hygroscopicity and easy in processing such as molding, cutting and polishing.

Another object of the present invention is to provide a process for producing an optical filter which is not devitrified even when used in a high-temperature and high humidity atmosphere.

To achieve such aims, in a first aspect of the present invention, there is provided an optical filter comprising a resin material obtained by copolymerizing a monomer represented by the following formula (I) and another monomer copolymerizable therewith, and a metallic compound mainly composed of a copper compound:

  (I)

wherein R represents

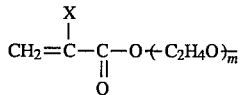

(wherein X represents a hydrogen atom or a methyl group, and m is an integer of 0 to 5), and n is 1 or 2.

In a second aspect of the present invention, there is provided a process for producing an optical filter comprising extracting and removing acid components produced from the reaction of a phosphorous group in a resin material and a metal salt.

DETAILED DESCRIPTION OF THE INVENTION

Figure 1:
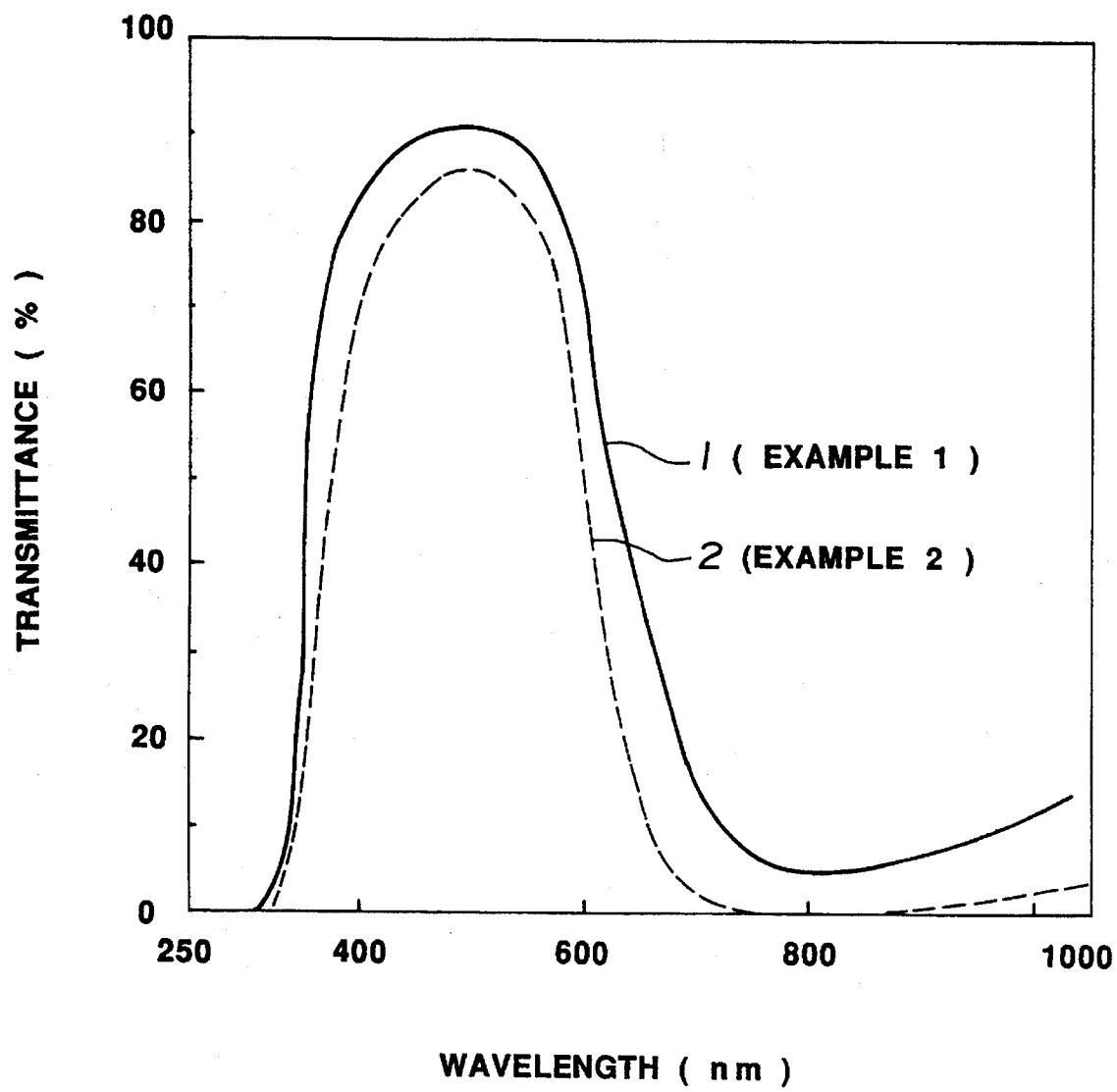
FIG. 1 is spectral transmittance curves of the optical filters obtained according to Examples 1 and 2 of the present invention.

In the present invention, a specific phosphorus group-containing monomer represented by the formula (I) is used as one of the monomeric reactants for obtaining a resin material constituting a primary component of the optical filter according to the present invention.

The specific phosphorous group-containing monomers represented by the formula (I) have in the molecular structure a phosphorous group which can be bonded with a copper compound such as described later. A copolymer holding a copper compound by means of the phosphorous group, shows typical light absorbing characteristics in the near infrared region.

Further, in the molecular structure of the specific phosphorous group-containing monomer used in the present invention, an acryloyloxy or methacryloyloxy group, which is a radical polymerizable functional group, is bonded through an ethylene oxide group, so that this specific phosphorous group-containing monomer has very high copolymerizability and can be copolymerized with various monomers.

In the formula (I) showing the molecular structure of the specific phosphorous group-containing monomer, R represents an acryloyloxy group (when X is a hydrogen atom) or a methacryloyloxy group (when X is a methyl group) to which an ethylene oxide group is bonded.

In the above molecular structure, the repeating number represented by m, of the ethylene oxide group is 0 to 5, preferably 1 to 4. When the value of m exceeds 5, the obtained copolymer may prove excessively low in hardness and incapable of practical use for producing an optical filter.

The number of hydroxyl groups, n is 1 or 2, is selected according to the optical filter-molding method employed and the purpose of use of the obtained filter.

When n=2, that is, when the number of the radical polymerizable functional groups bonded to phosphorus atoms is 1, the monomer of the formula (I) is apt to bond to a copper compound. On the other hand, when n=1, that is, when the number of the functional groups is 2, the monomer of the formula (I) has crosslinked polymerizability.

Therefore, in case of producing an optical filter of the present invention by an injection-molding method or an extrusion-molding method, which are the common molding methods for the thermoplastic resins, it is preferred to use a specific phosphorous group-containing monomer of the formula (I) wherein n is 2. It is of course possible to use other optical filter molding methods available in the art.

Thus, the value of n can be selected according to the intended performance of the optical filter to be produced, the molding method employed and the purpose of use of the produced filter. It is preferred to use both of a specific phosphorous group-containing monomer with n=1 and a specific phosphorous group-containing monomer with n=2 (for example, in a ratio of n=1 monomer to n=2 monomer of 10- 90 to 90-10, preferably 70 to 20). It is especially preferred to use the said both types of specific phosphorous group-containing monomer in a substantially equal ratio (i.e. 47-53 to 53-47), in which the solubility of the copper compound in the monomer mixture is enhanced.

The monomer mixture used for preparing a resin material for use in the present invention contains a copolymerizable monomer in addition to a specific phosphorous group-containing monomer described above.

The copolymer obtained from copolymerization of a specific phosphorous group-containing monomer and a copolymerizable monomer is low in hygroscopicity, can satisfy the hardness condition required for an optical filter and excellent in a heat resistance and form retention property, and by using such a copolymer, a molded product with excellent form stability can be obtained.

The copolymerizable monomer used in the present invention is not restricted as far as the following requirements are satisfied: (1) it can be uniformly dissolved and mixed with the specific phosphorous group-containing monomer; (2) it has good radical copolymerizability with the specific phosphorous group-containing monomer; and (3) it is capable of producing an optically transparent copolymer.

Examples of the copolymerizable monomers usable in the present invention include monofunctional acrylates or monofunctional methacrylates, for example, $(C_1-C_8)$alkyl acrylates or $(C_1-C_8)$alkyl methacrylates such as methyl acrylate, methyl methacrylate, ethyl acrylate, ethyl methacrylate, n-propyl acrylate, n-propyl methacrylate, n-butyl acrylate, n-butyl methacrylate, isobutyl acrylate, isobutyl methacrylate, n-hexyl acrylate, n-hexyl methacrylate, n-octyl acrylate, n-octyl methacrylate and 2-ethylhexyl methacrylate, and modified $(C_1-C_8)$alkyl acrylates or $(C_1-C_8)$modified alkyl methacrylates such as glycidyl acrylate, glycidyl methacrylate, 2-hydroxyethyl acrylate, 2-hydroxyethyl methacrylate, 2-hydroxypropyl acrylate, 2-hydroxypropyl methacrylate, 2-hydroxybutyl acrylate and 2-hydroxybutyl methacrylate; polyfunctional acrylates or polyfunctional methacrylates such as ethylene glycol diacrylate, ethylene glycol dimethacrylate, diethylene glycol diacrylate, diethylene glycol dimethacrylate, polyethylene glycol diacrylate, polyethylene glycol dimethacrylate, polypropylene glycol diacrylate, polypropylene glycol dimethacrylate, 1,3-butylene glycol diacrylate, 1,3-butylene glycol dimethacrylate, 1,4-butanediol diacrylate, 1,4-butanediol dimethacrylate, 1,6-hexanediol diacrylate, 1,6-hexanediol dimethacrylate, neopentyl glycol diacrylate, neopentyl glycol dimethacrylate, 2-hydroxy-1,3-dimethacryloxypropane, 2,2-bis[4-(methacryloxyethoxy)phenyl] propane, 2-hydroxy-1- acryloxy-3-methacryloxypropane, trimethylolpropane trimethacrylate, trimethylolpropane triacrylate, pentaerythritol triacrylate, pentaerythritol trimethacrylate, pentaerythritol tetraacrylate, and pentaerythritol tetramethacrylate; carboxylic acids such as acrylic acid, methacrylic acid, 2-methacryloyloxyethylsuccinic acid, and 2-methacryloyloxyethylphthalic acid; and aromatic vinyl compounds such as styrene, α-methylstyrene, chlorostyrene, dibromostyrene, methoxystyrene, divinylbenzene, vinylbenzoic acid, hydroxymethylstyrene, and trivinylbenzene.

These compounds may be used either singly or in admixture thereof.

Among the above-mentioned compounds, methyl methacrylate, ethyl acrylate, n-butyl methacrylate, 2-ethylhexyl methacrylate, ethylene glycol dimethacrylate, diethylene glycol dimethacrylate, 1,4-butanediol diacrylate, 1,6-hexanediol dimethacrylate, methacrylic acid, styrene, α-methylstyrene and divinylbenzene are preferred.

In the monomer mixture for preparing a resin material, the ratio (by weight) of the specific phosphorous group-containing monomer to the copolymerizable monomer is preferably in the range of 3:97 to 90:10, more preferably 10:90 to 80:20, still more preferably 30:70 to 70:30.

When the content of the specific phosphorous group-containing monomer is less than 3% by weight, it is hardly possible to produce the light-absorbing characteristics which is required in an optical filter. On the other hand, when the content exceeds 90% by weight, the obtained copolymer is high in hygroscopicity and tends to become too soft so as to not satisfy the required hardness condition.

The copolymer as a component of the resin material of the optical filter of the present invention can be obtained by radical-polymerizing a mixture of a specific phosphorous group-containing monomer and a copolymerizable monomer.

The method for radical polymerization is not specified in the present invention. It is possible to employ a known method using an ordinary radical polymerization initiator, such as cast polymerization, suspension polymerization, emulsion polymerization and solution polymerization.

The optical filter of the present invention comprises the above-described resin material and a metallic compound mainly composed of a copper compound.

This metallic compound has the effect of an efficient absorption of light in the near infrared region in cooperation with the phosphorous group contained in the resin material.

The expression of "mainly composed of a copper compound" used here means that the content of copper in all the metals contained in the metallic compound is not less than 80% by weight. More specifically, the "metallic compound" used in the present invention is a compound in which a compound containing divalent copper and a compound composed of other metal(s) are contained in a condition satisfying the above content. When the content of copper is less than 80% by weight based on all the metals contained in the metallic compound, the obtained optical filter is unable to efficiently absorb light in the near infrared region. Thus, the content of copper metal in the metallic compound is not less than 80% by weight, preferably not less than 85% by weight based on all the metals contained in the metallic compound.

Various compounds can be used as the copper compound constituting the metallic compound. Examples of such compounds include anhydrides and hydrates of copper acetate, copper chloride, copper formate, copper stearate, copper benzoate, copper ethylacetoacetate, copper pyrophosphate, copper naphthenate, copper citrate, and copper acetylacetonate.

Among these compounds, anhydrides and hydrates of copper acetate, copper chloride, copper formate, copper benzoate, copper ethylacetoacetate and copper acetylacetonate are preferred.

As the compounds composed of other metal(s), which constitutes another component of the metallic compound, compounds having such metals as sodium, potassium, calcium, iron, manganese, cobalt, magnesium, nickel or the like as components can be used according to the purpose of use of the produced optical filter.

In the optical filter of the present invention, the content of the metallic compound contained therein is preferably 0.1 to 50 parts by weight, more preferably 0.1 to 40 parts by weight, still more preferably 0.1 to 30 parts by weight based on 100 parts by weight of the resin material of the filter. When the content is less than 0.1 part by weight, the produced filter is unable to efficiently absorb light in the near infrared region. When the content exceeds 50 parts by weight, the metallic compound may fail to be uniformly dispersed in the copolymer.

The copper content in the optical filter of the present invention is preferably 0.1 to 20 parts by weight, more preferably 1 to 20 parts by weight based on 100 parts by weight of the resin material.

The method for incorporating the metallic compound in the copolymer is not specified in the present invention, but the following two methods may be cited as preferable methods.

(1) Method in which the metallic compound is added to and dissolved in a monomer mixture before the monomer mixture is subjected to radical polymerization.

By this method, the metallic compound can be contained in the monomer mixture to form a monomeric mixture composed of the metallic compound, a specific phosphorous group-containing monomer and a copolymerizable monomer, and by subjecting the resultant monomeric mixture to radical polymerization, there can be obtained a copolymer incorporated with the metallic compound (optical filter material). The thus obtained optical filter material can be used as an optical filter as it is, or after molding and processing into a desired form.

(2) Method in which the metallic compound is added to and mixed in the copolymer obtained by subjecting the monomer mixture to radical polymerization.

In this case, addition of the metallic compound in the copolymer may be accomplished by, for example, the following methods: i) the copolymer is melted and the metallic compound is added therein; ii) the copolymer is dissolved in an organic solvent, and the metallic compound is added in the resultant solution.

In the manner (1) and (2) described above, there can be obtained an optical filter material containing a metallic compound mainly composed of a copper compound.

The more preferable process for producing an optical filter according to the present invention is described below.

The optical filter production process of the present invention comprising the step for extracting and removing by a solvent, an acid component (organic acid component or inorganic acid component) produced from the reaction of the phosphorous group in the copolymer of the resin material and the metal salt, thereby obtaining an optical filter with a low content of acid component.

The extraction and removal of the acid component can be carried out at any optional stage in the optical filter production process regardless of before or after radical polymerization. For example, the extraction and removal step may be conducted at any of the following stages: (A) the stage prior to radical polymerization after preparation of a monomer mixture by mixing a mixed monomer composed of a specific phosphorous group-containing monomer and a copolymerizable monomer, with a metal salt mainly composed of copper salt; (B) the stage where radical polymerization of the said monomer mixture was completed and an optical filter material was obtained; and (C) the stage where molding of the optical filter material was completed.

In case the monomer mixture containing a crosslinkable monomer is polymerized by cast polymerization, it is preferred to conduct the acid component extraction and removal step after fabrication.

The solvent used in the said acid component extraction and removal step is one which can dissolve the acid component and has a pertinent affinity for the copolymer (affinity that the solvent, although incapable of dissolving the copolymer, can penetrate into this copolymer).

As such solvents, water; aliphatic lower alcohols such as methyl alcohol, ethyl alcohol, n-propyl alcohol and isopropyl alcohol; ketones such as acetone, methyl ethyl ketone and methyl isobutyl ketone; ethers such as ethyl ether and petroleum ether; aliphatic hydrocarbons and halides thereof such as n-pentane, n-hexane, n-heptane, chloroform, methylene chloride and carbon tetrachloride; and aromatic compounds such as benzene, toluene and xylene may be exemplified. These solvents may be used either singly or as a mixture thereof.

Of these solvents, water, methyl alcohol, ethyl alcohol, isopropyl alcohol, acetone and methylene chloride are preferred in view of that these solvents scarcely remain in the copolymer after the acid component removal.

The amount of the acid component removed by the extraction-removal step is preferably not less than 25 wt % more preferably not less than 30 wt %, still more preferably not less than 45 wt % based on the amount of the acid radical component of the metal salt used. Namely, the content of the free acid components in the optical filter is preferably not more than 75 wt %, more preferably not more than 70 wt % still more preferably not more than 55 wt % based on the amount of the acid radical components of the metal salts.

The optical filter produced after carrying out the said acid component extraction and removal step, as appreciated from the Examples shown below, is more excellent in the following points in comparison with the optical filter produced without undergoing such extraction-removal step.

(1) There scarcely takes place bleeding on the filter surface when the filter is used under a high-humidity atmosphere.

(2) There scarcely occur surface whitening (clouding) and reduction of transparency (devitrification) which are ascribed to bleeding on the film surface.

The process of the present invention may include a step for water washing and drying of the molded product to remove the solvent remaining after the acid component extraction-removal step, and a step for heat-treatment and pressing of the molded product for improving surface smoothness of the optical filter.

This optical filter material is manufactured into a desired form such as plate-like, columnar, lens-like, etc., according to the purpose of use, and polished to form an optical filter of the present invention.

Further, if desired, the thus produced optical filter may be subjected to a surface treatment with an organic or inorganic hard coating agent, by which it is possible to realize prevention of static charging, improvement of surface hardness and prevention of surface reflection. Also, the optical filter of the present invention and other optical material(s) such as quartz plate may be laminated to obtain a composite product.

The optical filter obtained according to the present invention has a specific gravity of not more than 1.45, preferably 1.10 to 1.40, a refractive index of 1.45 to 1.55, preferably 1.47 to 1.54, a water absorption of not more than 4% by weight, preferably not more than 3% by weight, and a light transmittance in the near infrared region (700–1,000 nm) not more than 15%, preferably not more than 10%, more preferably nor more than 5%.

The haze of the optical filter of the present invention is preferably not more than 20%, more preferably not more than 10%, still more preferably not more than 5%.

The optical filter produced in the manner described above is capable of efficiently absorbing light in the near infrared region and suited for use, in particular, as a photometric filter for adjusting the characteristics of the photodiodes or as a luminous efficiency filter, especially for red color.

As described above, the optical filter of the present invention comprises a resin material composed of a copolymer obtained from a monomer mixture composed of a specific phosphorous group-containing monomer and a copolymerizable monomer, and a metallic compound mainly composed of a copper compound and contained in the resin material, so that the optical filter of the present invention is capable of efficiently cutting-off light in the near infrared region and can be advantageously used as a photometric filter or a luminous efficiency filter for cameras. Further, the optical filter of the present invention is light in weight, low in hygroscopicity and proof against devitrification with the passage of time, and also has good processability for molding, cutting, polishing, etc., and high productivity.

The optical filter production process of the present invention comprises the step for extraction-removal of the acid component produced from the reaction of the phosphorous group in the copolymer (resin material) and metal salt, so that the optical filter obtained by this process has not only the excellent properties such as mentioned above, but also free of bleeding on the surface even when used in a high-humidity atmosphere. It also has excellent devitrification resistance and can exhibit its excellent light transmitting characteristics in the visible light region regardless of the use environment.

EXAMPLES

The present invention is further described below with reference to the examples thereof. It is to be understood, however, these examples are merely intended to be illustrative and not to be construed as limiting the scope of the invention. In the following descriptions of the Examples, all "parts" are "part by weight" unless otherwise noted.

Example 1

10 parts of a specific phosphorous group-containing monomer represented by the following formula (II), 10 parts of another specific phosphorous group-containing monomer represented by the following formula (III), 58.5 parts of methyl methacrylate, 20 parts of diethylene glycol dimethacrylate and 1.5 parts of α-methylstyrene were mixed well to prepare a mixed monomer. In the resultant mixed monomer, 14 parts of anhydrous copper benzoate (copper content being 2.9 parts based on 100 parts of the mixed monomer) was added and dissolved well by stirring at a temperature of 60° C. thereby obtaining a monomer mixture having anhydrous copper benzoate dissolved in the mixed monomer.

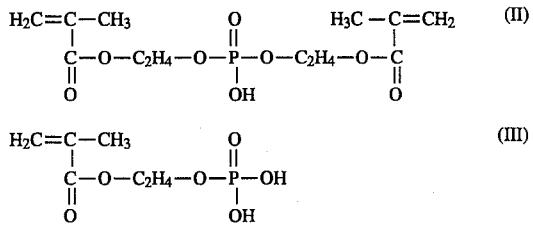

To the thus prepared monomer mixture, 2.0 parts of t-butyl peroxypivalate was added, followed by heating at a temperature of 45° C. for 16 hours, then at a temperature of 60° C. for 8 hours and further at a temperature of 90° C. for 3 hours to perform cast polymerization, thereby obtaining an optical filter material comprising a crosslinked polymer incorporated with a copper compound.

This optical filter material was cut into a 1 mm thick sheet and subjected to surface polishing to produce an optical filter of the present invention.

The optical filter thus obtained had a low specific gravity of 1.24 and its refractive index was 1.505.

Water absorption of this optical filter was determined in the following method.

The optical filter was dried at a temperature of 80° C. for 5 hours and then immersed in water of 25° C. for 24 hours, and water absorption (W) was determined from the following expression:

$$W=(W_2-W_1)/W_1 \times 100(\%)$$

wherein $W_1$ represents the weight (g) of the filter before immersion and $W_2$ represents the weight (g) of the filter after immersion.

As a result, water absorption of this optical filter was determined to be 0.9% by weight, and no devitrification of the filter was observed after immersion.

Further, spectral transmittance of this optical filter was measured by using a spectro-photometer. The result is shown in FIG. 1.

As seen from the solid-line curve 1 in FIG. 1, the optical filter obtained according to this Example could efficiently cut off light in the near infrared region (700– 1,000 nm).

When the spectral transmittance of the optical filter after immersion in water under the above conditions was similarly measured, there was obtained a spectral transmittance curve similar to that before immersion.

Example 2

15 parts of a specific phosphorous group-containing monomer represented by the above-shown formula (II), 15 parts of another specific phosphorous group-containing monomer represented by the above-shown formula (III), 45 parts of methyl methacrylate, 20 parts of 1,4-butanediol diacrylate and 5 parts of methacrylic acid were mixed well to prepare a mixed monomer. In the resultant mixed monomer, 15 parts of anhydrous copper acetate (copper content being 5.3 parts based on 100 parts of the mixed monomer) and 1 part of iron oxalate (II) dihydrate ($FeC_2O_4 \cdot 2H_2O$) (iron content being 5.4% by weight based on the total metal weight) were added and dissolved well by stirring at a temperature of 60° C., thereby obtaining a monomer mixture having anhydrous copper acetate and iron oxalate dissolved the mixed monomer.

The thus prepared monomer mixture was subjected to cast polymerization, cutting and polishing in the same way as Example 1 to produce an optical filter of the present invention.

This optical filter had a small specific gravity of 1.29 and its refractive index was 1.511. Water absorption of this optical filter as determined in the same manner as Example 1 was 3.2% by weight, and no devitrification of the filter was observed after immersion.

Also, spectral transmittance of this optical filter was measured by using a spectrophotometer. The result is shown in FIG. 1.

As seen from the dotted-line curve 2 in FIG. 1, the optical filter obtained according to this Example could efficiently absorb light in the near infrared region (700– 1,000 nm).

When the spectral transmittance of the optical filter after immersion in water under the above conditions was similarly measured, there was obtained a spectral transmittance curve similar to that before immersion.

Example 3

32 parts of the specific phosphorous group-containing monomer represented by the formula (II), 13 parts of the specific phosphorous group-containing monomer represented by the formula (III), 34 parts of methyl methacrylate, 20 parts of diethylene glycol dimethacrylate and 1 part of α-methylstyrene were mixed well to prepare a mixed monomer. To the resultant mixed monomer, 32 parts of anhydrous copper benzoate was added (copper metal content being 6.6 parts based on 100 parts of the mixed monomer) and dissolved well by stirring at a temperature of 80° C. to prepare a monomer mixture having anhydrous copper benzoate dissolved in the mixed monomer.

To the thus prepared monomer mixture was added 2.0 parts of t-butylperoxy (2-ethylhexanoate), and the resultant mixture was cast into a glass mold and subjected to cast polymerization by heating the mold at a temperature of 55° C. for 16 hours, then at a temperature of 70° C. for 8 hours and further at a temperature of 100° C. for 2 hours, successively, to obtain an optical filter material composed of a crosslinked polymer containing copper salt.

This optical filter material was immersed in methyl alcohol to extract benzoic acid which is the reaction product of the phosphorous group and anhydrous copper benzoate. The extracted amount of benzoic acid was 29 wt % based on an amount of acid radicals of anhydrous copper benzoate used.

The optical filter material undergone the said benzoic acid extraction-treatment was subjected to press molding at a temperature of 150° C. for 30 minutes to produce an optical filter having 1 mm in thickness.

Example 4

The same procedure as Example 3 was carried out except that in the benzoic acid extraction-treatment, the treating temperature and treating time were changed so that the extracted amount of benzoic acid was 47 wt % based on an amount of acid radicals of anhydrous copper benzoate used, to obtain an optical filter having 1 mm in thickness.

Example 5

The same procedure as Example 3 was conducted except that in the benzoic acid extraction-treatment, the treating temperature and treating time were changed so that the extracted amount of benzoic acid was 52 wt % based on an amount of acid radicals of anhydrous copper benzoate used, to obtain an optical filter having 1 mm in thickness.

Example 6

The same procedure as Example 3 was conducted except that in the benzoic acid extraction-treatment, the treating temperature and treating time were changed so that the extracted amount of benzoic acid was 77 wt % based on an amount of acid radicals of anhydrous copper benzoate used, to obtain an optical filter having 1 mm in thickness.

Example 7

The same procedure as Example 3 was conducted except that in the benzoic acid extraction-treatment, the treating temperature and treating time were changed so that the extracted amount of benzoic acid was 84 wt % based on an amount of acid radicals of anhydrous copper benzoate used, to obtain an optical filter having 1 mm in thickness.

Example 8

The same procedure as Example 3 was followed except that no benzoic acid extraction-treatment was conducted to obtain an optical filter having 1 mm in thickness.

Example 9

49 parts of the specific phosphorous group-containing monomer represented by the formula (II), 21 parts of the specific phosphorous group-containing monomer represented by the formula (III), 27 parts of methyl methacrylate, 2 parts of diethylene glycol dimethacrylate and 1 part of α-methylstyrene were mixed well to prepare a mixed monomer. To the resultant mixed monomer, 20 parts of anhydrous copper acetate was added (copper metal content being 6.6 parts based on 100 parts of the mixed monomer) and dissolved well by stirring at a temperature of 40° C. to obtain a monomer mixture having anhydrous copper acetate dissolved in the mixed monomer.

To the thus prepared monomer mixture was added 3.0 parts of t-butyl peroxypivalate, and the resultant mixture was cast into a glass mold and subjected to cast polymerization by heating the mold at a temperature of 45° C. for 16 hours, then at a temperature of 60° C. for 8 hours and further at a temperature of 80° C. for 3 hours successively to obtain an optical filter material composed of a crosslinked polymer having copper salt contained therein.

This optical filter material was immersed in a 50° C. methyl alcohol-water mixed solvent (methyl alcohol conc.: 50 wt %) for 16 hours to extract acetic acid which is the reaction product of the phosphorous group and anhydrous copper acetate. The extracted amount of acetic acid was 85 wt % based on the acid radicals of anhydrous copper acetate used.

The optical filter material undergone the said acetic acid extraction-treatment was then subjected to press molding at a temperature of 150° C. for 30 minutes to produce an optical filter having 1 mm in thickness.

<Evaluation of devitrification resistance>

Each of the optical filters obtained in Examples 3–9 was kept in a high-temperature and high-humidity atmosphere (temp. 70° C., RH 80%) for 140 hours.

Then haze of each said optical filter was measured by a hazeometer "TCM-M IIIDP" (mfd. by Tokyo Denshoku Co., Ltd.). Further, each optical filter was checked for bleeding on the surface. The results are shown in Table 1.

The optical filters obtained in Examples 7 and 8 were also subjected to measurement of transmittance (%) in the wavelength region (400–1,000 nm) of from the visible region to the near infrared region. The results are shown in Table 2.

TABLE 1

| | Acid component | Extraction quantity (wt %) | Haze (%) | Bleeding |
|---|---|---|---|---|
| Example 3 | Benzoic acid | 29 | 10 | No |
| Example 4 | " | 47 | 2 | No |
| Example 5 | " | 52 | 0.4 | No |
| Example 6 | " | 77 | 0.2 | No |
| Example 7 | " | 84 | 0.1 | No |
| Example 8 | " | — | 38 | Yes |
| Example 9 | Acetic acid | 85 | 0.1 | No |

TABLE 2

| Wavelength (nm) | 400 | 500 | 550 | 600 | 700 | 800 | 900 | 1000 |
|---|---|---|---|---|---|---|---|---|
| Example 7 | 63% | 85% | 85% | 51% | 1.5% | 0.1% | 0.1% | 0.3% |
| Example 8 | 55% | 76% | 82% | 41% | 1.0% | 0.1% | 0.3% | 1.0% |

What is claimed is:

1. An optical filter having transmittance of not more than 15% in the near infrared region of 700 to 1000 nm, said optical filter comprising:

a resin material obtained by copolymerizing 200 parts by weight of a monomer mixture composed of a monomer represented by the following formula (I) and a monomer copolymerizable therewith in the presence of 0.1 to 40 parts by , weight of a metallic compound, based on 100 parts by weight of the resin material, mainly composed of a copper compound;

$$PO(OH)_n R_{3-n} \tag{I}$$

wherein R represents

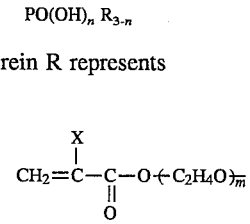

in which X represents a hydrogen atom or a methyl group, and m is an integer of 0 to 5, and n is 1 or 2,
wherein acid component produced from the reaction of a phosphorous group in the resin material and the metallic compound have been removed.

2. An optical filter according to claim 1, wherein the amount of the acid component removed is not less than 25 wt % based on the amount of the acid radical component of the metallic compound.

3. An optical filter according to claim 1, wherein the content of copper in the optical filter is 0.1 to 20 parts by weight based on 100 parts by weight of the resin material.

4. An optical filter according to claim 1, wherein the ratio of the monomer units represented by the formula (I) to the copolymerizable monomer units in the resin material is 3:97 to 90:10.

5. An optical filter according to claim 1, wherein the monomer represented by the formula (I) is a mixture of a n=1 monomer and a n=2 monomer.

* * * * *